Dec. 25, 1945.   H. E. WARREN   2,391,531
BALANCED VALVE
Original Filed April 15, 1943

INVENTOR
Henry E. Warren
BY
ATTORNEY

Patented Dec. 25, 1945

2,391,531

UNITED STATES PATENT OFFICE 2,391,531

BALANCED VALVE

Henry E. Warren, Ashland, Mass.

Original application April 15, 1943, Serial No. 483,162. Divided and this application September 16, 1943, Serial No. 502,601

4 Claims. (Cl. 251—75)

This invention relates to balanced valves wherein the dynamic forces due to the flow of liquid in the valve during the operation thereof are balanced or neutralized, as distinguished from the dispositions of the static forces due to the fluid within the valve in such manner as to prevent the displacement of the same, and particularly to a valve adapted for use in speed governors of the type described in my application Serial Number 483,162, filed April 15, 1943, of which this application is a division, although the valve which constitutes the subject matter of the present application is capable of use in many other relations.

The object of the invention is the provision of a novel balanced valve having one or more pairs of reaction and free ports. If only one pair is used, one member thereof is constructed to be a reaction port tending to produce an opening force upon the valve element, and the other, the free port, a closing force upon said element which substantially neutralizes such opening force. Preferably, a plurality of such pairs are used and are disposed in spaced relation around the periphery of the valve sleeve. In either case, the reaction and free ports are connected with an intake port by an annular groove in the valve element upon the outward movement of said element.

For convenience of description, the valve may be considered as comprising an upper and a lower half. It is to be understood, of course, that the description of the upper half applies also to the lower half.

Figure 4:
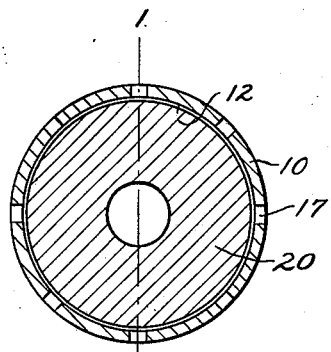
Fig. 4 is a transverse section taken on the line 4—4 of Fig. 1.
Figure 5:
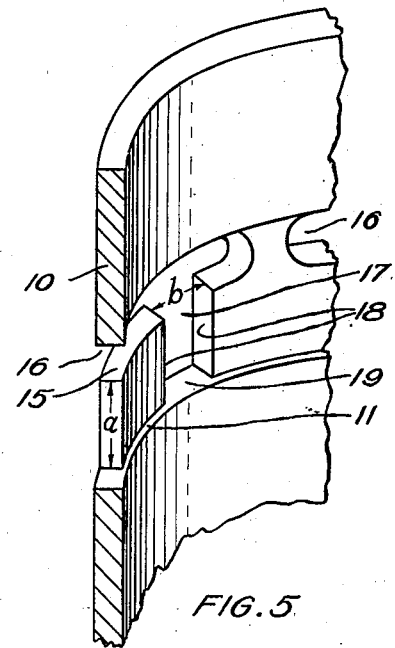
Fig. 5 is a fragmentary perspective view of the valve sleeve.

In the particular drawing selected for more fully disclosing the principle of my invention, 10 is a valve sleeve fixedly secured within any suitably ported housing. The inner surface of said sleeve is provided with a circumferential groove 11, which is shallow with respect to the width thereof, designated in Fig. 5 as a. The valve element snugly fitting within the valve sleeve, at all times co-operates with said groove to afford a narrow annular passageway 12, through which the oil or other fluid under pressure will flow when the intake port 13 is connected to the outlet port 16 in the wall of the sleeve by way of the specially contoured annular groove 14 formed in the valve element. The grooved portion of the sleeve communicates at its outer edge 15 with a plurality of openings, viz., the outlet ports 16, herein shown as annular, although it will be understood that the shape of such ports is not material. Said passageway and said openings constitute reaction ports producing upon the valve a force that will open it more widely as soon as the intake port is brought into communication with the outlet port. The sleeve is also provided with a plurality of ports 17, termed herein "free" ports, which pass through the wall of the sleeve and are in spaced relation around the grooved portion thereof. The free ports are shown in the present instance as having two straight parallel sides 18, rising from the base 19 thereof, the plane of which is herein shown as normal to the axis of the valve.

The effect of the discharge of oil through the opening 17 when the intake port 13 is brought into communication with the outlet port 16, is to exert upon the valve element a force tending to close the valve (Bernoulli effect). I have discovered that by the proper proportioning of the reaction ports and the free ports, the two forces aforesaid may be made substantially equal, so that the valve can be moved, especially while rotating, with an almost negligible force.

Figures 1, 2, 3:
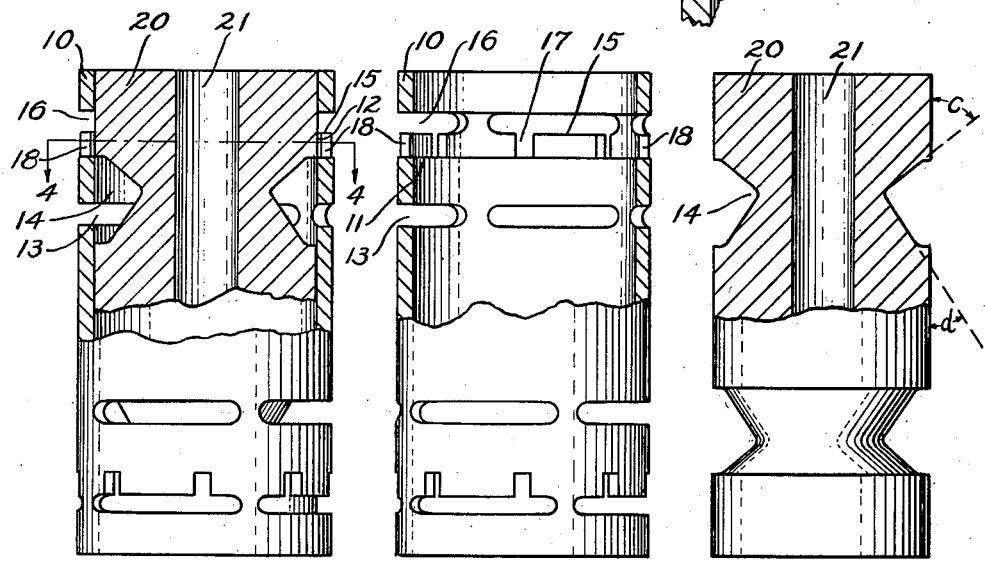
Fig. 1 is an elevation partly in central vertical section on the line 1—1 of Fig. 4, showing a balanced valve embodying my invention.
Fig. 2 is an elevation partly in central vertical section showing the valve sleeve of said balanced valve.
Fig. 3 is an elevation partly in central vertical section showing the valve element of said balanced valve.

The sleeve inwardly of the grooved portion thereof, is provided with a plurality of intake ports 13, one for each pair of said free and reaction ports. The valve element 20 may be mounted on a rod (not shown) passing through the central bore 21, and is provided with said annular groove 14, which, as will be apparent, is disposed to connect the intake ports with the respective pairs of free and reaction ports upon the movement of said valve element outwardly from the position indicated in Fig. 1. The valve shown has, for convenience, outward flow through all the sets of said free and reaction ports, but similar results may be obtained with inward flow, if the reaction and free ports are made in the valve instead of in the sleeve.

While it will be apparent to those skilled in the art that a multiplicity of sizes and shapes of the various grooves and openings hereinbefore described may be employed to effect the desired result, I include herein for completeness of disclosure and without limiting myself thereto, one set of dimensions as follows, to wit:

The circumferential ditsance $b$ between the walls of the opening 17 is .250". The width $a$ of the annular groove is .214", and the depth of the groove 11 in the inner surface of the sleeve is .018".

The internal diameter of the valve sleeve is 1.638".

The annular groove 14, formed in the valve element, is shown in the present instance as formed by two intersecting conical surfaces, one of greater length along its generatrix than the other, said surfaces being disposed at unequal angles with the axis of the valve element. In the present instance, the angle $c$ of the upper surface with said axis is approximately 50°, and that of the other, indicated at $d$, approximately 30°.

While I have shown and described my improved balanced valve as having in both the upper and lower halves thereof a plurality of pairs of free and reaction ports, each pair constituting an outlet port 16 and a plurality of co-operating intake ports 13, it is to be understood that each half of the valve may have but one pair of free and reaction ports forming one outlet port and one intake port co-operating therewith.

Having thus described an illustrative embodiment of my invention, without, however, limiting the same thereto, what I claim and desire to secure by Letter Patent is:

1. A balanced valve wherein the dynamic forces due to the flow of liquid in the valve during the operation thereof are balanced or neutralized, said valve comprising a sleeve and a valve element disposed for axial movement therein and snugly fitting the inner surface thereof, the inner surface of said sleeve having therein a circumferential groove shallow with respect to the width thereof and co-operating at times with a contiguous portion of the outer surface of said valve element to afford a narrow annular passageway between said valve element and the inner surface of the grooved portion of the sleeve, said grooved portion of the sleeve communicating at its outward edge with a plurality of openings passing through the wall of the sleeve, said passageway and openings constituting reaction ports constructed and arranged to produce an opening force upon the valve element, said sleeve being provided with a plurality of ports passing through the wall thereof in spaced relation around the grooved portion thereof, the ports last mentioned constituting free ports constructed and arranged relative to said reaction ports to produce a closing force upon said valve element substantially equal to said opening force thereon, said free and reaction ports being arranged in pairs around the periphery of said sleeve, said sleeve inwardly of the grooved portion thereof being provided with a plurality of intake ports, one for each pair of said free and reaction ports, and said valve element being provided with a peripheral groove disposed to connect said intake ports with the respective pairs of free and reaction ports upon the outward movement of said element, substantially as and for the purpose described.

2. A balanced valve wherein the dynamic forces due to the flow of liquid in the valve during the operation thereof are balanced or neutralized, said valve comprising a sleeve and a valve element disposed for axial movement therein and snugly fitting the inner surface thereof, the inner surface of said sleeve having therein a circumferential groove shallow with respect to the width thereof and co-operating at times with a contiguous portion of the outer surface of said valve element to afford a narrow annular passageway between said valve element and the inner surface of the grooved portion of the sleeve, said grooved portion of the sleeve communicating at its outward edge with an opening passing through the wall of the sleeve, said passageway and opening constituting a reaction port constructed and arranged to produce an opening force upon the valve element, said sleeve being provided with a port passing through the wall thereof, the port last mentioned constituting a free port constructed and arranged relative to said reaction port to produce a closing force upon the valve element substantially equal to said opening force thereon, said sleeve inwardly of the grooved portion thereof being provided with an intake port, and said valve element being provided with a peripheral groove disposed to connect said intake port with said free and reaction ports upon the outward movement of said element, substantially as and for the purpose described.

3. A balanced valve wherein the dynamic forces due to the flow of liquid in the valve during the operation thereof are balanced or neutralized, said valve comprising a sleeve and a valve element disposed for axial movement therein and snugly fitting the inner surface thereof, said sleeve being provided with a reaction port constructed and arranged to produce an opening force upon said valve element and with a free port constructed and arranged relative to said reaction port to produce a closing force upon said valve element substantially equal to said opening force thereon, said sleeve being provided also with an intake port disposed inwardly of said free and reaction ports, and said valve element having a peripheral groove disposed to connect said intake port with said free and reaction ports upon the outward movement of said element substantially as and for the purpose described.

4. A balanced valve wherein the dynamic forces due to the flow of liquid in the valve during the operation thereof are balanced or neutralized, said valve comprising a sleeve and a valve element disposed for axial movement therein and snugly fitting the inner surface thereof, the inner surface of said sleeve having therein a circumferential groove shallow with respect to the width thereof and co-operating at times with a contiguous portion of the outer surface of said valve element to afford a narrow annular passageway between said valve element and the inner surface of the grooved portion of the sleeve, said grooved portion of the sleeve communicating at its outward edge with an outlet port passing through the wall of the sleeve, said sleeve being provided with a port passing through the wall thereof, said passageway and outlet port being so constructed and arranged relatively to said port as to produce a dynamically balanced valve, said sleeve inwardly of the grooved portion thereof being provided with an intake port, and said valve element being provided with a peripheral groove disposed to connect together said intake port, said narrow annular passageway, said port passing through the wall of said sleeve and said outlet port upon the outward movement of said element, substantially as and for the purpose described.

HENRY E. WARREN.